US011068046B1

(12) United States Patent
Zavesky et al.

(10) Patent No.: US 11,068,046 B1
(45) Date of Patent: Jul. 20, 2021

(54) EVALUATION OF DIGITAL TWINS USING SOCIAL AUTOMATONS

(71) Applicant: AT&T Intellectual Property I, L.P., Atlanta, GA (US)

(72) Inventors: Eric Zavesky, Austin, TX (US); Jason Decuir, Cedar Park, TX (US); Robert Gratz, Lockhart, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 16/747,780

(22) Filed: Jan. 21, 2020

(51) Int. Cl.
*G06F 3/01* (2006.01)
*G06T 19/00* (2011.01)
*G06T 19/20* (2011.01)

(52) U.S. Cl.
CPC ............ *G06F 3/011* (2013.01); *G06T 19/006* (2013.01); *G06T 19/20* (2013.01); *G06T 2210/04* (2013.01); *G06T 2215/16* (2013.01); *G06T 2219/012* (2013.01); *G06T 2219/2004* (2013.01)

(58) Field of Classification Search
CPC ....... G06F 3/011; G06T 19/006; G06T 19/20; G06T 2215/16; G06T 2210/04; G06T 2219/2004; G06T 2219/012
See application file for complete search history.

(56) References Cited

U.S. PATENT DOCUMENTS

| 2019/0005200 A1* | 1/2019 | Zimmerman | G16H 10/60 |
| 2020/0285788 A1* | 9/2020 | Brebner | G06K 9/628 |

OTHER PUBLICATIONS

"Oculus is giving avatars a range of human expressions". Mariella Moon, Apr. 4, 2019. Facebook / Oculus—https://www.engadget.com/2019/04/04/oculus-expressive-avatars/.
"MIT helps machine learning systems to perceive human emotions". Malek Murison, Jul. 26, 2018, Internet of Business. https://internetofbusiness.com/mit-helps-machine-learning-systems-to-perceive-human-emotions/.
"Concept for subway card augmented to show full nyc subway" Apr. 2019 https://www.reddit.com/r/augmentedreality/comments/baw1v1/concept_for_subway_card_augmented_to_show_full/.
"Real-Time AR Self-Expression with Machine Learning". Mar. 8, 2019, Posted by Artsiom Ablavatski and Ivan Grishchenko, Research Engineers, Google AI Blog https://ai.googleblog.com/2019/03/real-time-ar-self-expression-with.html.

* cited by examiner

*Primary Examiner* — Maurice L. McDowell, Jr.
*Assistant Examiner* — Donna J. Ricks

(57) ABSTRACT

In one example, the present disclosure improves simulations based on the use of digital twins using social automatons. In one example, a method performed by a processing system including at least one processor includes constructing a digital twin of a physical environment, constructing a social automaton, wherein the social automaton comprises a virtual representation of an individual that is programmed to exhibit behaviors and characteristics of the individual, and inserting the social automaton into the digital twin to create an extended reality media in which interactions of the social automaton with the digital twin simulate interactions of the individual with the physical environment.

20 Claims, 4 Drawing Sheets

US 11,068,046 B1

EVALUATION OF DIGITAL TWINS USING SOCIAL AUTOMATONS

The present disclosure relates generally to extended reality (XR) media, and relates more particularly to devices, non-transitory computer-readable media, and methods for evaluating digital twins using social automatons.

BACKGROUND

Extended reality (XR) is an umbrella term used to describe various types of immersive technology, including augmented reality (AR), virtual reality (VR), and mixed reality (MR), in which the real-world environment may be enhanced or augmented with virtual, computer-generated objects or actions. One particular use of XR technology involves the creation of digital "twins," or virtual models of real, physical items. The ability to create a digital twin of a physical environment, for example, has become an increasingly powerful alternative to costly buildout for understanding the impacts of design and placement changes. For instance, in an industrial setting, a digital twin of a manufacturing floor may be constructed in order to assess the impacts of proposed layout changes (e.g., relocation of equipment, egress and ingress points, etc.). In real estate applications, a digital twin of a room in a home may be constructed to evaluate different arrangements of furniture or different architectural changes (e.g., moving a wall, installing cabinetry, etc.). In urban planning applications, a digital twin of a road intersection may be constructed in order to evaluate different changes to the intersection's configuration (e.g., left turn lane versus jug handle versus roundabout, etc.).

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
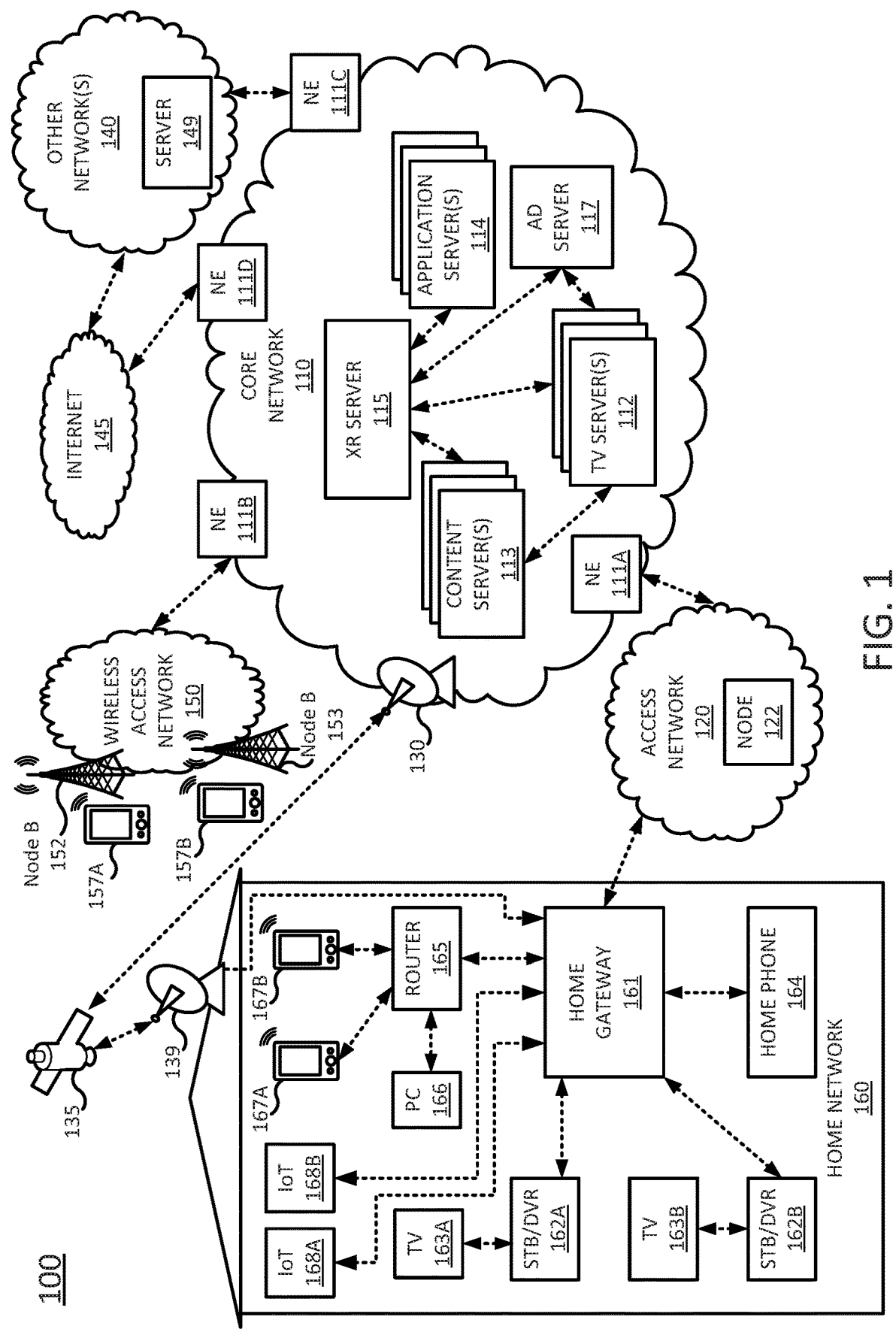
FIG. 1 illustrates an example network related to the present disclosure.

In one example, the present disclosure improves simulations based on the use of digital twins using social automatons. In one example, a method performed by a processing system including at least one processor includes constructing a digital twin of a physical environment, constructing a social automaton, wherein the social automaton comprises a virtual representation of an individual that is programmed to exhibit behaviors and characteristics of the individual, and inserting the social automaton into the digital twin to create an extended reality media in which interactions of the social automaton with the digital twin simulate interactions of the individual with the physical environment.

In another example, a non-transitory computer-readable medium stores instructions which, when executed by a processing system including at least one processor, cause the processing system to perform operations. The operations include constructing a digital twin of a physical environment, constructing a social automaton, wherein the social automaton comprises a virtual representation of an individual that is programmed to exhibit behaviors and characteristics of the individual, and inserting the social automaton into the digital twin to create an extended reality media in which interactions of the social automaton with the digital twin simulate interactions of the individual with the physical environment.

In another example, a device includes a processor and a non-transitory computer-readable medium that stores instructions which, when executed by the processor, cause the processing system to perform operations. The operations include constructing a digital twin of a physical environment, constructing a social automaton, wherein the social automaton comprises a virtual representation of an individual that is programmed to exhibit behaviors and characteristics of the individual, and inserting the social automaton into the digital twin to create an extended reality media in which interactions of the social automaton with the digital twin simulate interactions of the individual with the physical environment.

As discussed above, the ability to create a digital twin of a physical environment has become an increasingly powerful alternative to costly buildout for understanding the impacts of design and placement changes. Proposed changes to the physical environment can be visualized and evaluated in a detailed, scale simulation before the changes are actually implemented in the physical environment. For instance, in an industrial setting, a digital twin of a manufacturing floor may be constructed in order to assess the impacts of proposed layout changes (e.g., relocation of equipment, relocation of egress and ingress points, etc.). In real estate applications, a digital twin of a room in a home may be constructed in order to evaluate different arrangements of furniture or different architectural changes (e.g., moving a wall, installing cabinetry, etc.). In urban planning applications, a digital twin of a road intersection may be constructed in order to evaluate different changes to the intersection's configuration (e.g., left turn lane versus jug handle versus roundabout, etc.).

Conventional digital twins of physical environments tend to simulate the static elements of the physical environments well. For instance, techniques such as scanning with three-dimensional object recognition and placement can be used to create a detailed digital twin that replicates the boundaries (e.g., walls, floors, ceilings, etc.) of a physical environment, the objects (e.g., furniture, machinery, etc.) that are present in the physical environment, and other static elements. However, the more dynamic, social (e.g., human) elements of the physical environments are not as easy to replicate. For instance, it may be useful to simulate the effects that changes in the physical environment may have on human interactions and human-driven events in the physical space (e.g., fire drills, meetings, parties, etc.). As an example, constructing a digital twin of a room may help to confirm that a large piece of furniture will fit within the walls of the room. However, the piece of furniture may partially obstruct human access to another item in the room or may create a bottleneck when many people are present in the room, and these are effects that a simple static simulation may fail to capture.

Although more dynamic elements can be simulated in the digital twin, conventional approaches to simulating the dynamic elements tend to be largely computational. As an example, traffic conditions at a road intersection at a given time of day may be simulated based on historical traffic information for the intersection, which may be obtained from a database. For instance, the database may indicate an average number of vehicles that pass through the intersection in each direction during a given window of time (e.g., Mondays between 7:00 AM and 10:00 AM). These simulations may fail to capture natural variations in behavior, anomalies, and the like.

Examples of the present disclosure provide social automatons for evaluating digital twins of physical environments. Within the context of the present disclosure, a "social automaton" is understood to be a virtual representation of an individual, such as a person (e.g., a specific person or a representative of a particular demographic) or an animal (e.g., a cat or dog). The social automaton may be deployed within an XR environment, such as a digital twin. The social automaton in this context may be programmed to demonstrate different behaviors and to exhibit different characteristics that a real individual in the physical environment might demonstrate. Moreover, the ways in which different social automatons interact with each other in the digital twin can indicate how interactions between real individuals may occur in the corresponding physical environment.

The social automatons may thus be deployed into the digital twin of the physical environment, which may be altered (relative to the actual physical environment) to incorporate some proposed change to the physical environment. The social automatons may explore the digital twin in an interactive manner, and the reactions of the social automatons to the digital twin and to each other while in the digital twin may be observed. In this way, the dynamic impacts of changes to the physical environment can be evaluated before the changes are implemented, allowing for improvements to the changes to be made preemptively. Moreover, using a social automaton rather than a computational simulation may provide for more natural interactions to be simulated in the digital twin, thereby allowing for a more realistic understanding of the impacts of various changes in the physical environment.

To better understand the present disclosure, FIG. 1 illustrates an example network 100 related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140 and/or the Internet 145.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker), a gaming console, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140 (which may include servers 149), Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an extended reality (XR) server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113, advertising server 117, and XR server 115 to select which video programs, or other content and advertisements to provide to the home network 160 and to others.

In one example, content servers 113 may store scheduled television broadcast content for a number of television channels, video-on-demand programming, local programming content, gaming content, and so forth. The content servers 113 may also store other types of media that are not audio/video in nature, such as audio-only media (e.g., music, audio books, podcasts, or the like) or video-only media (e.g., image slideshows). For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various viewers.

In one example, XR server 115 may generate computer-generated content including digital twins of physical environments. As discussed above, a digital twin of a physical environment comprises a virtual model or replica of a real world physical environment. For instance, the XR server 115 may host an application that performs scanning and three-dimensional object recognition in the physical environment. The application may use the results of the scanning and object recognition to construct a digital twin that replicates the boundaries (e.g., walls, floors, ceilings, etc.) of the physical environment, the objects (e.g., furniture, machinery, etc.) that are present in the physical environment, and other elements of the physical environment. Alternatively, the application may retrieve stored information about the dimensions of the physical environment and the dimensions and locations of objects in the physical environment, and may construct the digital twin based on the stored information. In one example, the XR server 115 may store the information about the dimensions and locations. In another example, the information may be provided to the XR server 115 by the users, e.g., via the mobile devices 157A, 157B, 167A, and 167B, the PC 166, the home phone 164, the TVs 163A and 163B, and/or Internet of Things (IoT) devices 168A and 168B. Alternatively, the information may be retrieved by the XR server 115 from network storage, e.g., application servers 114.

In a further example, the application hosted on the XR server 115 may also generate at least one social automaton for deployment in the digital twin. As discussed above, the social automaton may comprise a virtual representation of a person (e.g., an avatar) which may be deployed within an XR environment. The social automaton may represent a specific person or may be representative of a particular demographic (e.g., a person over the age of sixty-five, a toddler, a person in a wheelchair, etc.). The social automaton may be programmed to demonstrate different behaviors and to exhibit different characteristics based on the person or demographic that the social automaton is intended to represent. For instance, if the social automaton is programmed to represent a toddler, then the social automaton may be short and unsteady on its feet and may move quickly. If the social automaton is programmed to represent an elderly person, however, the social automaton may be taller and may move more cautiously.

The application hosted on the XR server 115 may insert the social automaton (and potentially additional social automatons) into the digital twin, and may subsequently simulate the ways in which the social automaton interacts with the (replicated) physical environment and with other social automatons in the physical environment. The simulation of the social automaton's interactions may be generated at least in part from historical or statistical data that indicates typical behaviors for the person or demographic represented by the social automaton. In one example, the XR server 115 may store the historical data. In another example, the historical data may be provided to the XR server 115 by the users, e.g., via the mobile devices 157A, 157B, 167A, and 167B, the PC 166, the home phone 164, the TVs 163A and 163B, and/or Internet of Things (IoT) devices 168A and 168B. Alternatively, the data may be retrieved by the XR server 115 from network storage, e.g., application servers 114.

For instance the historical data may comprise user profiles maintained by a network service (e.g., an Internet service provider, a streaming media service, a gaming subscription, etc.), portions of social media profiles maintained by a social media web site (e.g., a social networking site, a blogging site, a photo-sharing site, etc.), or the like. The historical data may indicate information about the users, such as the users' ages, interests, devices (e.g., mobile devices, IoT devices, gaming devices, etc.), medical or other conditions that may affect the users' behaviors and/or mobility in the physical environment, and the like.

The application hosted on the XR server 115 may also insert the social automatons into the digital twin in order to simulate events that may occur within the physical environment. For instance, the application may deploy a plurality of social automatons of different demographics in order to simulate a two hundred person reception in a digital twin of wedding venue. Alternatively, the application may deploy a plurality of social automatons representing injured and/or ill people in order to simulate a fire drill in a digital twin of a hospital or assisted living facility. As another example, the application may deploy a plurality of social automatons of different demographics in order to simulate the flow of a large crowd entering a digital twin of an amusement park, a museum, a stadium, or another public space.

Figure 4:
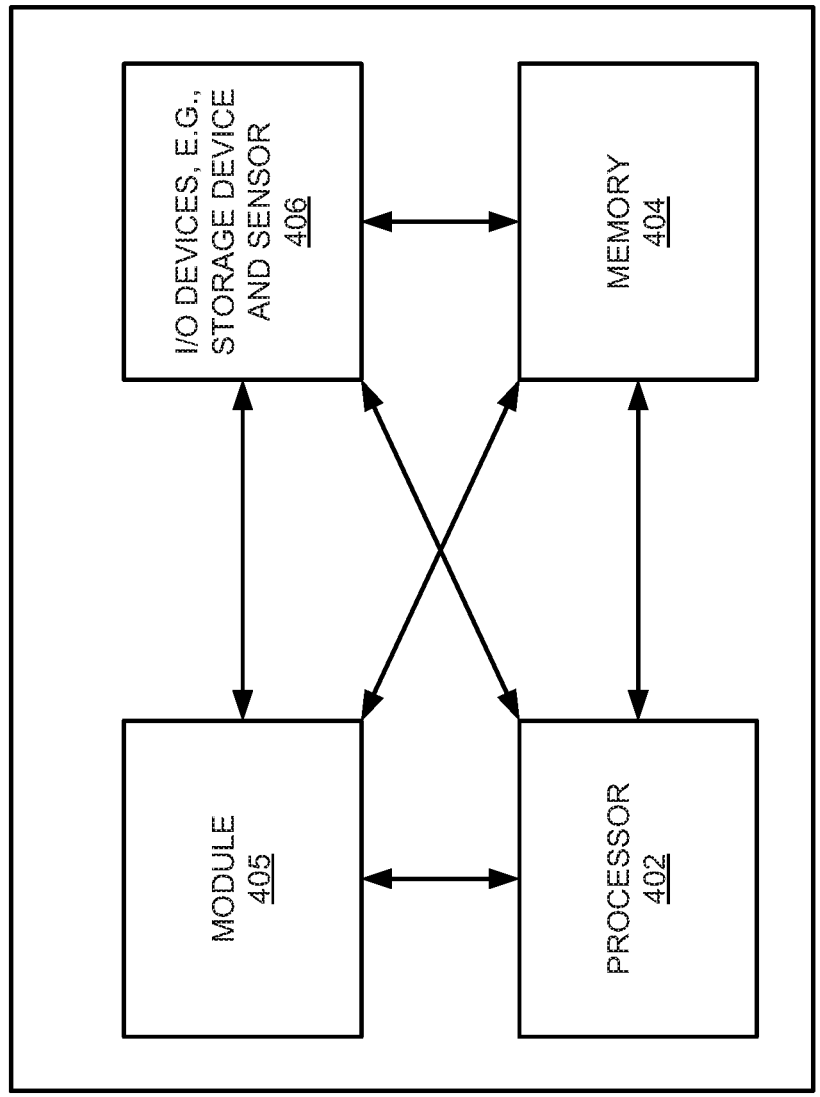
FIG. 4 depicts a high-level block diagram of a computing device specifically programmed to perform the functions described herein.

In one example, any or all of the television servers 112, content servers 113, application servers 114, XR server 115, and advertising server 117 may comprise a computing system, such as computing system 400 depicted in FIG. 4.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

IoT devices 168A and 168B may include any types of devices that are capable of being controlled automatically and/or remotely. For instance, the IoT devices 168A and 168B may include "smart" home devices, such as a smart thermostat, a smart lighting system, or the like. The IoT devices 168A and 168B may also include gaming devices, such as gaming controllers, a gaming chair, or the like. Although FIG. 1 illustrates two IoT devices 168A and 168B, it will be appreciated that the home network 160 may include any number of IoT devices. A greater number and variety of IoT devices may allow for a more immersive experience to be generated.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
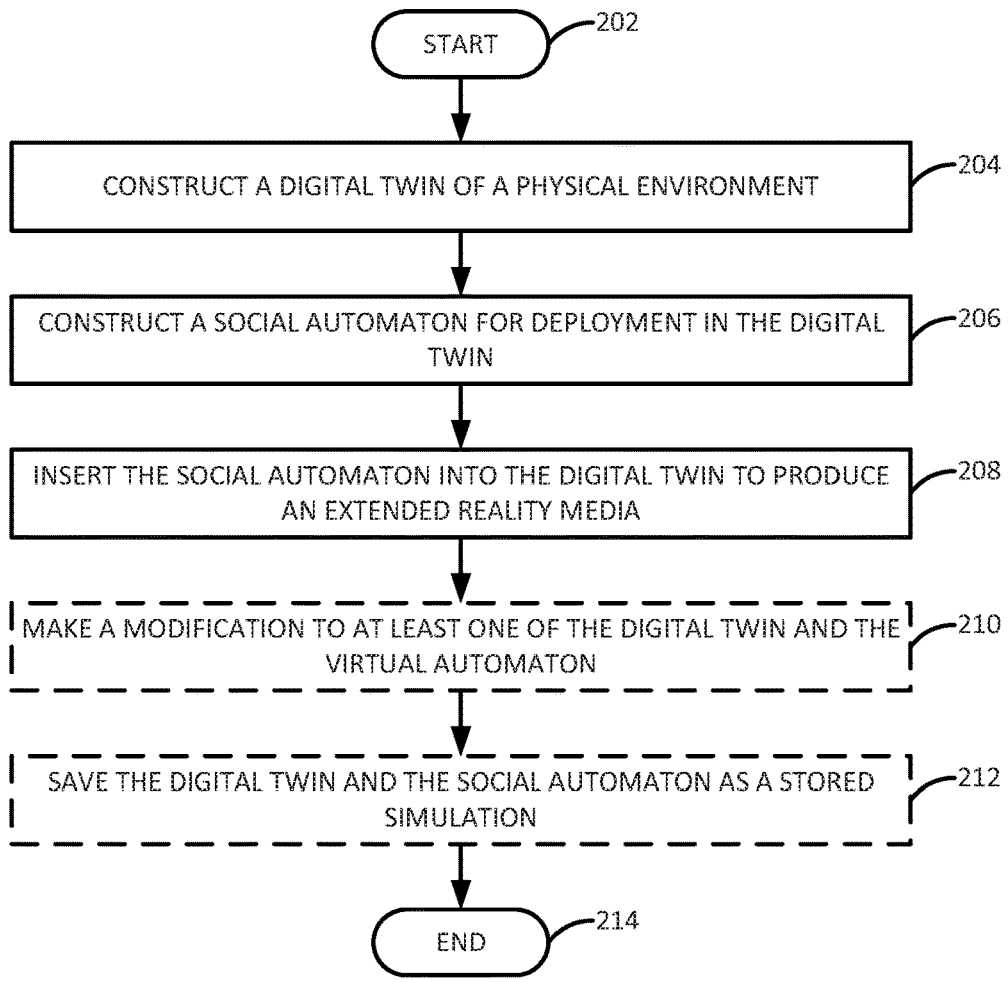
FIG. 2 illustrates a flowchart of a method for evaluating a digital twin of a physical environment using a social automaton, in accordance with the present disclosure.

To further aid in understanding the present disclosure, FIG. 2 illustrates a flowchart of a method 200 for evaluating a digital twin of a physical environment using a social automaton, in accordance with the present disclosure. In one example, the method 200 may be performed by an XR server that is configured to construct digital twins of physical environments, including social automatons that may be deployed in the digital twins to simulate human interactions within the physical environment, such as the XR server 115 illustrated in FIG. 1. However, in other examples, the method 200 may be performed by another device, such as the processor 402 of the system 400 illustrated in FIG. 4. For the sake of example, the method 200 is described as being performed by a processing system.

The method 200 begins in step 202. In step 204, the processing system may construct a digital twin of a physical environment. For instance, the physical environment may be a real world location, such as an office building, a school, a factory, an amusement park, a museum, a room in a house, or the like. The digital twin may comprise a virtual model that replicates the dimensions and layout of the physical environment, as well as one or more objects that are present in the physical environment. In one example, the digital twin may comprise an interactive virtual model, such as a virtual model created using extended reality techniques.

Figure 3A:
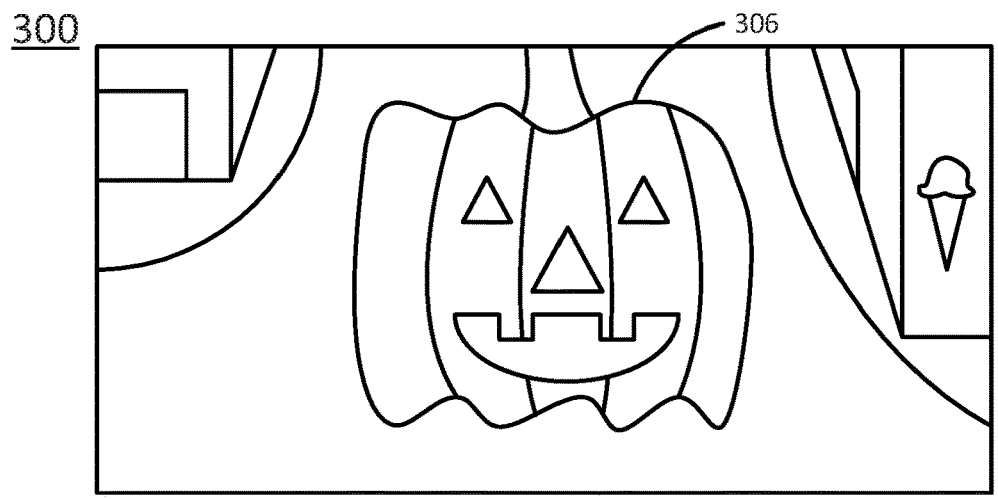
FIG. 3A illustrates an example digital twin that may be constructed according to the method of FIG. 2.

FIG. 3A, for instance, illustrates an example digital twin 300 that may be constructed according to the method 200 of FIG. 2. In the example of FIG. 3A, the digital twin replicates the entrance to an amusement park.

The digital twin may be constructed in any one or more of a number of ways. For instance, in one example, the physical environment to be "twinned" may be imaged using three-dimensional scanning techniques that capture the dimensions and layout of the physical environment, as well as the dimensions and locations of any objects that are present in the physical environment. The physical environment may be scanned using a head mounted display or other imaging device. Virtual representations of the physical environment and/or objects may then be constructed from the images. In another example, the dimensions and layout of the physical environment (and optionally any objects present in the physical environment) may be provided to the processing system (e.g., by a human user or by a database). In one example, the digital twin may be superimposed onto an image of the physical environment, e.g., using fiducials, recognized three-dimensional objects, or the like, in order to verify that the dimensions and layout of the physical environment have been accurately rendered in the digital twin.

In one example, the digital twin may be constructed to include one or more permanent or temporary modifications to the physical environment (without making the modifications to the physical environment in the real world), e.g., so that the impacts of the modification can be evaluated. For instance, if the physical environment is a public place such as the entrance to an amusement park, the digital twin might replicate the dimensions and layout of the entrance, but might also include a proposed seasonal or holiday display that is positioned just inside the gates. If the physical environment is a home, the digital twin might replicate the dimensions and layout of a room within the home, but might also change the location of a wall in the room. If the physical environment is a manufacturing floor, the digital twin might replicate the dimensions and layout of the factory floor, but might also rearrange the locations of one or more pieces of manufacturing equipment. In one example, the modification(s) may be defined by a user.

For instance, referring back to FIG. 3A, the example digital twin 300 of the amusement park entrance may modify the present layout of the entrance to include a holiday display 306. In the example of FIG. 3A, the holiday display 306 comprises a giant inflatable Halloween jack-o-lantern. The holiday display 306 may comprise an item or items that are meant to be deployed at the amusement park entrance temporarily (e.g., for a matter of weeks), rather than a permanent part of the entrance layout. However, in other examples, a permanent fixture (e.g., a statue, a fountain, or the like) may be proposed for deployment at the entrance.

In step 206, the processing system may construct a social automaton for deployment in the digital twin. As discussed above, the social automaton may comprise a virtual representation of a person (e.g., an avatar) which may be deployed within the digital twin and may interact with the digital twin and any objects within the digital twin, as well as with other social automatons that are present in the digital twin. The social automaton may represent a specific person or may represent a particular demographic. In one example, the behaviors and/or attributes of the social automaton may be defined by a user and rendered by the processing system accordingly. In one example, step 206 may involve the construction of a plurality of social automatons for simultaneous deployment in the digital twin. The plurality social automatons may all have the same behaviors and attributes, or two or more social automatons of the plurality of social automatons may have different behaviors and attributes (e.g., relative to each other).

For instance, as discussed above, a social automaton constructed in accordance with step 206 may be programmed to interact with the physical environment as a member of a particular demographic (e.g., an elderly person, a toddler, a person using a mobility aid such as a wheelchair or walker, etc.). In this case, the social automaton may be programmed to demonstrate different behaviors and to exhibit different characteristics based on the demographic that the social automaton is intended to represent. For instance, if the social automaton is programmed to represent a toddler, then the social automaton may be short and unsteady on its feet and may move quickly. If the social automaton is programmed to represent an elderly person, however, the social automaton may be taller and may move more cautiously.

In another example, the social automaton may be programmed to exhibit specific behaviors in response to encountering certain objects or brands of objects in the digital twin. For instance, a social automaton that is programmed to demonstrate the behaviors and exhibit the characteristics of children may slow down its movement when passing an object that represents a display device (e.g., a television, a computer monitor, a movie screen, or the like). By contrast, a social automaton that is programmed to demonstrate the behaviors and exhibit the characteristics of an adult or an elderly person may be unaffected by the proximity to such objects.

Figure 3B:
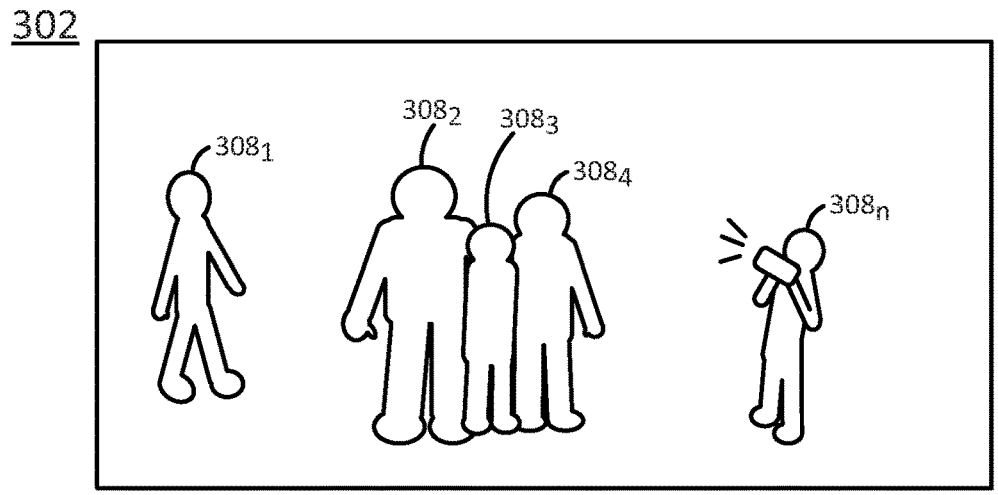
FIG. 3B illustrates an example overlay comprising set of social automatons that may be constructed for insertion into the example digital twin of FIG. 3A.

FIG. 3B, for instance, illustrates an example overlay 302 comprising set of social automatons $308_1$-$308_n$ (hereinafter individually referred to as a "social automaton 308" or collectively referred as "social automatons 308") that may be constructed for insertion into the example digital twin 300 of FIG. 3A. In this case, the set of social automatons 308 may be programmed to replicate the behaviors and characteristics of various people who may be present in the amusement park, such as guests (e.g., families with children, groups of teenagers, etc.) and employees (e.g., photographers, ride operators, vendors, etc.). In one example, the number of social automatons 308 constructed for insertion into the digital twin 300 (and the number of each demographic represented) may simulate an estimated number of guests expected to be entering the park during a given window of time and/or on a given day (e.g., on a summer Saturday between 10:00 AM and 12:00 PM).

In one example, data modeling and analysis techniques may be used to construct the social automaton. For instance, recorded data (e.g., images, video, etc.) of one or more individuals who belong to a particular demographic may be analyzed and used as the basis for modeling a representative social automaton. In another example, a predictive service may construct the social automaton based on a name or other social links (if the social automaton is meant to represent a specific individual). For instance, the general demographics, the social media connections and/or activity, the profile data from one or more service providers, and/or the like for the specific individual may be mined for information that can be incorporated into the social automaton. For instance, if the specific individual's social media activity indicates that the specific individual is a marathon runner, or is currently using crutches while recovering from an injury, then a social automaton programmed to represent the individual may be tailored accordingly (e.g., the movements, speed, gait, or the like of the social automaton may be tuned to match the movements, speed, gait, or the like of the specific individual). In another example, a social automaton that is programmed to represent a specific demographic may be created from an aggregate movement (e.g., from historical opt-in gyroscopic and location data) or from more generalized statistics (e.g., a statistic indicating that the average adult typically walks at a pace of two to three miles per hour).

In one example, constructing the social automaton in accordance with step 206 may involve retrieving the social automaton from a database of stored social automatons. For instance, social automatons that were constructed for past simulations may be stored and used in future simulations to expedite processing. Optionally, modifications may be made to a stored social automaton based on the specifications of the user. For instance, a stored social automaton that represents a specific individual may be modified to reflect a change to the specific individual (e.g., an injury, an item carried by the specific individual, etc.).

In step 208, the processing system may insert the social automaton into the digital twin to create an extended reality media in which interactions of the social automaton with the digital twin simulate interaction of an individual (e.g., the individual or demographic that the social automaton is programmed to represent) with the physical environment that is represented by the digital twin. For instance, in one example, the social automaton may be rendered as an overlay that is superimposed on the digital twin. For instance, the overlay may be aligned with the digital twin (e.g., using fiducials or other alignment mechanisms). As discussed above, step 208 may involve inserting a plurality of social automatons into the digital twin, where the plurality of social automatons may all have the same behaviors and characteristics, or at least two social automatons of the plurality of social automatons may have different behaviors and characteristics (e.g., relative to each other).

For instance, referring again to the example of FIGS. 3A and 3B, the amusement park operators may wish to identify the optimal placement for the holiday display 306 to minimize any impact on the flow of foot traffic at the park entrance. Thus, the set of social automatons 308 may be programmed to replicate the behaviors and characteristics of various people who may interact with or encounter the holiday display 306 in some way, such as guests (e.g., families with children, groups of teenagers, etc.) and employees (e.g., photographers, ride operators, vendors, etc.). In one example, the number of social automatons 308 constructed for insertion into the digital twin 300 (and the number of each demographic represented) may simulate an estimated number of park patrons expected to be entering the park at a given time and/or on a given day.

Figure 3C:
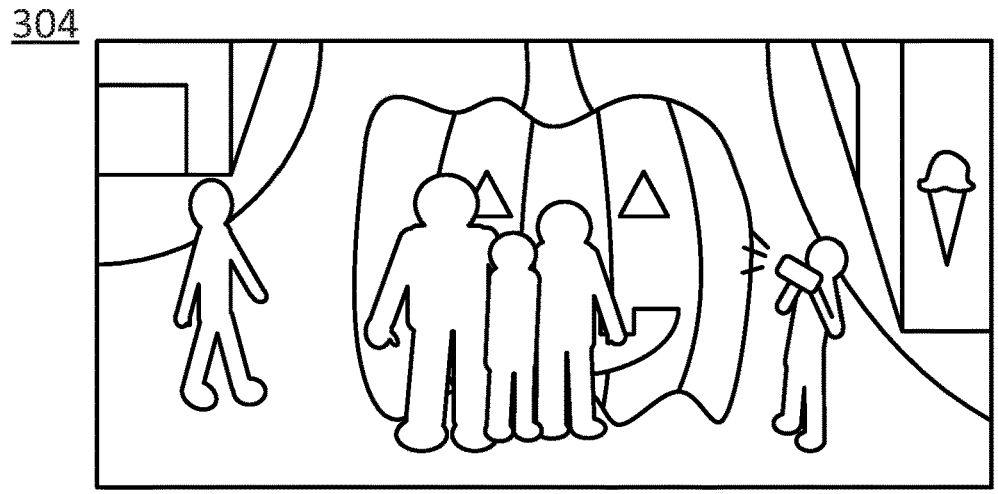
FIG. 3C illustrates an extended reality media in which the social automatons of FIG. 3B may be inserted into the digital twin of FIG. 3A.

FIG. 3C illustrates an extended reality media 304 in which the social automatons of FIG. 3B may be inserted into the digital twin 300 of FIG. 3A. For instance, some guests may linger to take photos with the seasonal display 306 (e.g., social automatons $308_2$-$308_4$), while other guests may bypass the seasonal display 306 and continue through to other sections of the park (e.g., social automaton $308_1$). A photographer employed by the park may be stationed near the holiday display 306 in order to take photos of guests (e.g., social automaton $308_n$). Still other park employees may be positioned near the entrance to take tickets, check bags, and the like. The social automatons 308 may be programmed to simulate these behaviors when the social automatons 308 are inserted into the digital twin 300. Inserting the social automatons into the digital twin and allowing the social automatons to interact with the physical environment (including the holiday display 306) may allow park operators to determine that, during peak crowd times, the holiday display 306 may inhibit the flow of guests into the park. As such, the park operators may consider moving the holiday display 306 to another area of the park.

In one example, insertion of the social automaton into the digital twin may be guided by one or more user-defined parameters including time to simulate (e.g., time of day, day of week, season, or the like), situation to simulate (e.g., a special event occurring in the physical environment such as a wedding versus a normal operating day), and/or object to simulate (e.g., a new object or other change that is proposed to the physical environment and simulated in the digital twin). In some examples, social automatons may be capable of interacting with each other as well as with objects in the digital twin.

In optional step 210 (illustrated in phantom), the processing system may make a modification to at least one of the digital twin and the virtual automaton that is inserted into the digital twin. In one example, the modification may involve the addition, removal, or modification of an object in the digital twin (e.g., addition or relocation of a piece of equipment, etc.). In another example, the modification may involve the modification of the dimensions and/or layout of the digital twin (e.g., removal or addition of a wall, etc.). In another example, the modification may involve the addition, removal, or modification of a social automaton (e.g., adding another social automaton, changing the behaviors and/or characteristics of an existing social automaton, etc.). Making the modification may involve repeating steps that were performed previously, such as imaging the physical environment, rendering the digital twin and/or social automation, aligning an overlay including the social automaton with the digital twin, and/or other steps. Thus, steps 204-208 may be repeated one or more times for evaluation of the same digital twin.

In one example, the modification may be made in response to a request from a user. For instance, the user may reconsider a particular change to the physical environment based on the interaction of a social automaton within the digital twin of the physical environment. In another example, the modification may be made in response to a user accepting a suggestion from the processing system. For instance, the processing system may suggest the deletion, addition, or modification of a social automaton. The suggestion may be based on simulations that other users have asked the processing system to perform in the past (e.g., x percent of users who have asked to simulate scenario A have also asked to simulate scenario B).

In optional step 212 (illustrated in phantom), the processing system may save the digital twin and the social automaton as a stored simulation. The stored simulation may help the processing system to render future, potentially similar digital twins and/or social automatons. The stored simulation may also help the processing system to make recommendations for modifications to future digital twins and/or social automatons, as discussed above.

The method 200 may end in step 214.

The method 200 therefore allows a user to assess the dynamic impacts of proposed changes to a physical environment. The proposed changes may comprise physical changes to the physical environment itself (e.g., changing the dimensions or layout of the physical environment) changes to objects in the physical environment (e.g., modifying, moving, adding, or removing objects), changes to a presence in the physical environment (e.g., more or fewer people present), or other changes. By inserting social automatons into a digital twin that represents the changed physical environment, the user may be able to accurately simulate the effects that the proposed changes will have on the interactions of individuals within the physical environment, without having to incur the effort or expense to actually make the proposed changes in the physical environment. This may allow the user to evaluate one or more alternatives to the proposed changes and to identify the best way to carry out the proposed changes before making any actual changes to the physical environment.

Thus, examples of the present disclosure leverage a fully virtual environment (e.g. both the physical environment and the individual(s) interacting with and in the physical environment may comprise virtual models) in order to test different scenarios for gaming, training, architectural and event planning, and other applications. The present disclosure therefor minimizes the costs and the time associated with testing the scenarios in more conventional manners (e.g., implementing the scenarios in the real world physical environment).

For instance, if the digital twin replicates a wedding venue (e.g., a catering hall, a hotel ballroom, a restaurant, or the like), then the social automatons may be programmed to replicate the behaviors and characteristics of different wedding guests. For instance, some adult guests may congregate near the bar area, while other younger guests may tend to gather near a photo booth. Guests of varying ages may form groups on the dancefloor. Based on insertion of these social automatons into the digital twin, a wedding planner might decide to set the bar area some distance away from the dancefloor (e.g., so that the respective crowds do not overlap and form an even bigger crowd), to rearrange the placement of guest tables, or to make other changes to the physical environment of the wedding venue.

In another example, if the digital twin replicates a wing of a museum, then the social automatons may be programmed to replicate the behaviors and characteristics of museum guests. For instance, some guests may linger at a particular exhibit for a long time, while other guests may simply walk past the exhibit. The digital twin may move the particular exhibit to a different location in the wing of the museum, and the interactions of the social automatons with the relocated particular exhibit may be observed in order to determine whether moving the particular exhibit to the different location improves the flow of foot traffic through the museum (e.g., minimizes the formation of crowds so large that guests cannot get through to other sections of the museum).

Although the social automatons discussed above are described as simulating the behaviors and characteristics of people (or different groups of people), it will be appreciated that social automatons for non-human beings may also be inserted into a digital twin without departing from the scope of the present disclosure. For instance, social automatons that are programmed to simulate the behaviors and characteristics dogs and cats may be inserted into the digital twin of a home or business (e.g., a veterinary office, a pet store, a hospital that hosts therapy animals, etc.) in order to evaluate the safety of introducing the dogs or cats into the physical environment. In a similar example, the social automatons may be programmed to represent semi-sentient IoT or robotic entities whose behavior is defined by network and affinity descriptors (e.g., must have high bandwidth, must use minimal power, must always be adjacent to another entity, etc.). In this case, the network and affinity descriptors may comprise stand-ins for interaction simulations, instead of behaviors typical of living entities.

Social automatons may also be programmed to simulate a specific but atypical behavior for a person, demographic, or other being. For instance, a plurality of social automatons may be programmed to specifically simulate unruly behavior, for instance in order to evaluate the effects of a potentially rowdy group of fans at a football game or concert. Another social automaton could be programmed to simulate an unfriendly dog, in order to evaluate the potential effects of the unfriendly dog on the safety of a home.

Further examples of the present disclosure may insert social automatons into a digital twin in order to simulate and evaluate environmental conditions that might be too dangerous or too difficult to test in the physical environment, such as zero gravity conditions, fires, natural disasters, or the like.

Still further examples of the present disclosure may be used by a telecommunications service provider looking to determine where to place network equipment. For instance, a plurality of digital twins comprising a plurality of candidate sites for new 5G cells may be constructed. Social automatons may be inserted into the plurality of digital twins in order to determine where the service provider's customers are most likely to require service.

In another example, social automatons may be inserted into gaming or training media. For instance, a social automaton could be programmed to behave in a hostile manner or an excited manner, or could be programmed to have an affinity for a specific object in the gaming or training scenario (e., trying to guard the object).

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 may be implemented as the system 400. For instance, a server (such as might be used to perform the method 200) could be implemented as illustrated in FIG. 4.

As depicted in FIG. 4, the system 400 comprises a hardware processor element 402, a memory 404, a module 405 for evaluating digital twins using social automatons, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for evaluating digital twins using social automatons may include circuitry and/or logic for performing special purpose functions relating to the operation of a home gateway or AR server. The input/output devices 406 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for evaluating digital twins using social automatons (e.g., a software program comprising computer-executable instructions) can be loaded into memory 404 and executed by hardware processor element 402 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for evaluating digital twins using social automatons (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
constructing, by a processing system comprising at least one processor, a digital twin of a physical environment, wherein the digital twin replicates a set of dimensions of the physical environment, a layout of the physical environment, and at least one object that is present in the physical environment, and wherein the digital twin includes a modification to the physical environment, without making the modification to the physical environment;
constructing, by the processing system, a social automaton, wherein the social automaton comprises a virtual representation of an individual that is programmed to exhibit behaviors and characteristics of the individual; and
inserting, by the processing system, the social automaton into the digital twin to create an extended reality media in which interactions of the social automaton with the digital twin simulate interactions of the individual with the physical environment.

2. The method of claim 1, wherein the modification comprises a change to the set of dimensions.

3. The method of claim 1, wherein the modification comprises a change to the layout.

4. The method of claim 1, wherein the modification comprises a change in a location of the at least one object.

5. The method of claim 1, wherein the modification is a proposed permanent modification.

6. The method of claim 1, wherein the modification is a proposed temporary modification.

7. The method of claim 1, wherein the individual is a specific individual.

8. The method of claim 7, wherein the social automaton is constructed based on an analysis of social media content associated with the specific individual.

9. The method of claim 1, wherein the individual is a representative of a demographic of individuals.

10. The method of claim 9, wherein the social automaton is constructed based on an analysis of recorded data depicting at least one individual of the demographic.

11. The method of claim 1, wherein the social automaton is one of a plurality of social automatons that is simultaneously inserted into the digital twin.

12. The method of claim 11, wherein interactions of the plurality of social automatons with each other in the digital twin are simulated by the extended reality media.

13. The method of claim 11, wherein at least two social automatons of the plurality of social automatons are programmed to exhibit different behaviors and characteristics.

14. The method of claim 1, wherein the social automaton is rendered by the processing system as an overlay, and the inserting comprises superimposing the overlay over the digital twin.

15. The method of claim 1, further comprising:
modifying, by the processing system at least one of the digital twin and the social automaton, subsequent to the inserting.

16. The method of claim 15, wherein the modifying is performed in response to a user request.

17. A non-transitory computer-readable medium storing instructions which, when executed by a processing system including at least one processor, cause the processing system to perform operations, the operations comprising:
constructing a digital twin of a physical environment, wherein the digital twin replicates a set of dimensions of the physical environment, a layout of the physical environment, and at least one object that is present in the physical environment, and wherein the digital twin includes a modification to the physical environment, without making the modification to the physical environment;
constructing a social automaton, wherein the social automaton comprises a virtual representation of an individual that is programmed to exhibit behaviors and characteristics of the individual; and
inserting the social automaton into the digital twin to create an extended reality media in which interactions of the social automaton with the digital twin simulate interactions of the individual with the physical environment.

18. The non-transitory computer-readable medium of claim 17, wherein the modification comprises a change to the set of dimensions.

19. The non-transitory computer-readable medium of claim 17, wherein the modification comprises a change to the layout.

20. A device comprising:
a processor; and
a computer-readable medium storing instructions which, when executed by the processor, cause the processor to perform operations, the operations comprising:
constructing a digital twin of a physical environment, wherein the digital twin replicates a set of dimensions of the physical environment, a layout of the physical environment, and at least one object that is present in the physical environment, and wherein the digital twin includes a modification to the physical environment, without making the modification to the physical environment;
constructing a social automaton, wherein the social automaton comprises a virtual representation of an individual that is programmed to exhibit behaviors and characteristics of the individual; and
inserting the social automaton into the digital twin to create an extended reality media in which interactions of the social automaton with the digital twin simulate interactions of the individual with the physical environment.

* * * * *